June 8, 1926.
R. G. PETERSON
HOG WATERER
Filed March 20, 1925
1,587,551
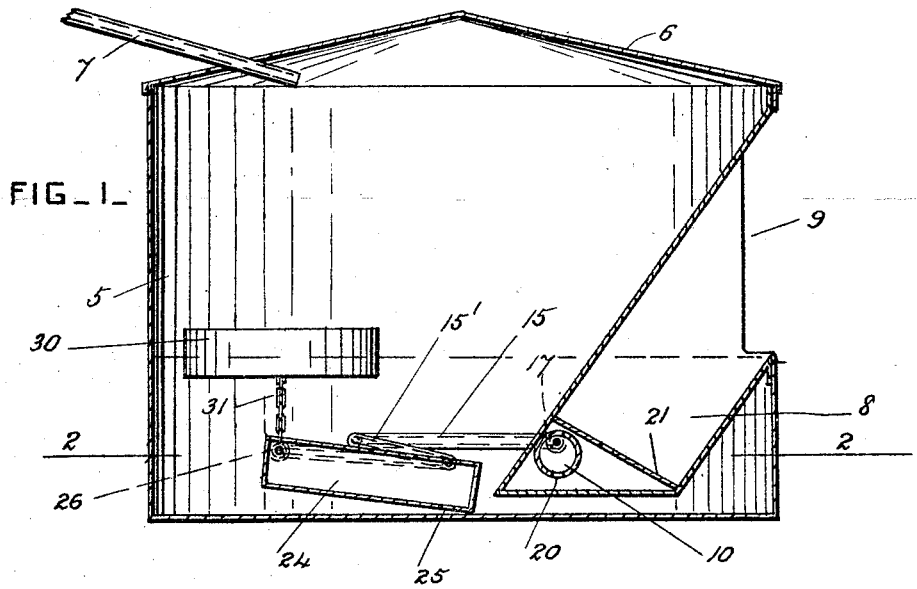
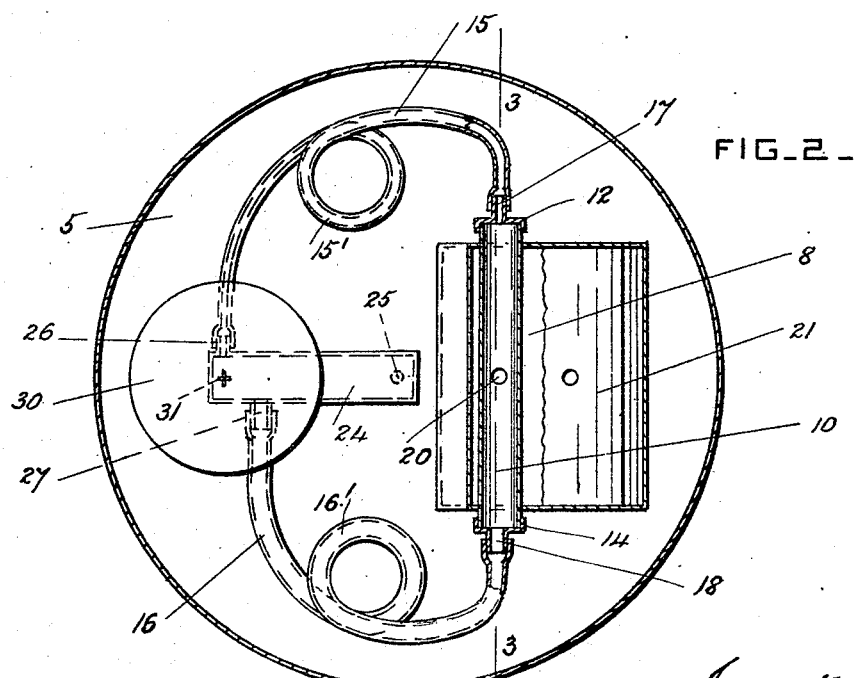
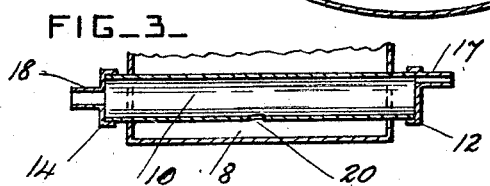

Patented June 8, 1926.

1,587,551

UNITED STATES PATENT OFFICE.

REUBEN G. PETERSON, OF WESSINGTON SPRINGS, SOUTH DAKOTA.

HOG WATERER.

Application filed March 20, 1925. Serial No. 16,988.

This invention relates to devices for supplying drinking water to hogs and other stock, and more particularly to devices specially adapted for hogs; and it consists in the novel construction and combination of the parts hereinafter fully described and claimed and in which the drinking trough is inclosed in the supply tank and is supplied with water from the tank automatically as the water is consumed by the animals.

In the drawings, Figure 1 is a vertical section through a hog waterer constructed according to this invention. Fig. 2 is a plan view taken in section on the line 2—2 in Fig. 1. Fig. 3 is a longitudinal section through the air vessel taken on the line 3—3 in Fig. 2.

This device is similar in operation to that of a device for which I have filed an application on March 27, 1924, Serial Number 702,233, and in which application the operation is fully explained. A tank 5 for a supply of drinking water is provided, and is preferably cylindrical in form. The top of the tank is closed by a removable cover 6, which is preferably slidable, and is conical in form so as to shed the rain. The tank is supplied with water from a pump through a pipe 7 which projects through an opening in the cover. The cover can be slid upon the top of the tank whenever it is necessary to break ice on the top of the water.

A drinking trough 8 for the animals is provided and is preferably rectangular in cross-section, and it is arranged in an inclined position inside the tank with its upper and open end secured to the side of the tank around a drinking opening 9. An air vessel 10 is secured in the lower part of the drinking trough, and is formed of a cylindrical pipe the end portions of which are secured in holes in the sides of the drinking trough, and are closed by caps 12 and 14 on its ends which project into the supply tank.

Two flexible hose pipes 15 and 16 are provided, and preferably have coils 15′ and 16′ in their middle portions, but these coils may be omitted if the hose pipes are sufficiently flexible to work well without them. The hose pipe 15 is for air, and one end of it is connected to a nozzle 17 on the upper part of the cap 12 so that it may communicate with the air space of the air vessel. The other hose pipe 16 is for water, and one end of it is connected to a nozzle 18 on the other cap 14 so that it communicates with the water space of the air vessel. The position of the water nozzle 18 is not important, but it is made of much larger area than the air nozzle 17. The air vessel has an outlet opening or hole 20 in its lower side which communicates with the water space of the drinking trough. A plate or false bottom 21 is placed over the air vessel in the drinking trough to facilitate cleaning out the latter.

An inlet chamber 24 is arranged inside the supply tank, and preferably radially of its center and crosswise of the drinking trough. This inlet chamber is preferably formed of a piece of pipe closed at each end. The inner end portion of the chamber 24 nearest the drinking trough has an inlet hole 25 in its lower side, and this inlet hole is of predetermined small size. The other and outer end portion of the chamber has a nozzle 26 which has a flexible air pipe 15 secured to it. A second nozzle 27 is formed on the chamber 24 out of line with the nozzle 26 and not so near the outer end of the chamber as the air nozzle. The small area of the connections of the air pipe afford a restricted passage compared with that of the water pipe, and thereby aid the air pipe in functioning properly.

The outer end portion of the inlet chamber 24 operates as an air vessel, and the air pipe 15 connects the air spaces of the two air vessels. A float 30 is secured by a flexible connection or chain 31 to the outer end portion of the inlet chamber 24. The normal high level of the water in the tank is adjusted by varying the length of the chain 31.

The water in the drinking trough which is exposed to the air is hindered from freezing because the drinking trough is inclosed in the supply tank which is closed, and which holds a large body of water which is supplied to it by the pump at a temperature above that of the atmosphere. The tank can also have earth banked up around it, or be provided with or formed of heat insulating material to hinder the escape of heat from the water.

The air vessel 10 compensates for slight variations in the level of the water in the drinking trough 8. When the tank is full the outer end portion of the inlet chamber is raised by the float, and the water in the inlet chamber offers a resistance to the upward passage of water through the small inlet hole 25. This resistance is varied by the float in proportion to the height of the water in the tank, and becomes less as the height of the water in the tank is diminished, so that the supply of water to the drinking trough is regulated automatically.

What I claim is:

1. In a hog waterer, a supply tank, a drinking trough arranged in the supply tank, a pipe secured in the lower part of the drinking trough with its ends projecting into the supply tank, said pipe having an outlet which communicates with the drinking trough, flexible pipes connected to the projecting ends of the said pipe at one end, an inlet chamber having one end portion connected to the free ends of the flexible pipes and having an inlet opening at its other end, and a float connected to the same end of the inlet chamber as the flexible pipes.

2. A hog waterer as set forth in claim 1, the said drinking trough being provided with a false bottom arranged over the pipe secured in its lower part.

3. A hog waterer as set forth in claim 1, the said flexible pipes being provided with coils between their ends to increase their flexibility.

4. A hog waterer as set forth in claim 1, one of the said flexible pipes being adapted for air and provided with a passage of less area than the other flexible pipe and being connected to the said inlet chamber farther from its said inlet hole than the other flexible pipe which is adapted for water.

5. A hog waterer as set forth in claim 1, the said pipe in the drinking trough having one of the said flexible pipes secured to the upper portion of one end of it and forming a connection between an air space in its upper portion and an air space in the outer end portion of the said inlet chamber.

In testimony whereof I have affixed my signature.

REUBEN G. PETERSON.